(12) United States Patent
Hu et al.

(10) Patent No.: US 7,492,612 B2
(45) Date of Patent: Feb. 17, 2009

(54) HIGH-VOLTAGE GENERATOR

(75) Inventors: Geu-Cheng Hu, Taoyuan (TW); Hsiang-Yuan Yu, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 197 days.

(21) Appl. No.: 11/627,355

(22) Filed: Jan. 25, 2007

(65) Prior Publication Data
US 2008/0037292 A1 Feb. 14, 2008

(30) Foreign Application Priority Data
Aug. 11, 2006 (TW) ............................... 95129701 A

(51) Int. Cl.
*H02M 3/335* (2006.01)
(52) U.S. Cl. .......................................... 363/19; 363/18
(58) Field of Classification Search .................. 363/16, 363/18, 19, 95, 97, 131
See application file for complete search history.

(56) References Cited

U.S. PATENT DOCUMENTS

| | | | | |
|---|---|---|---|---|
| 5,850,335 A | * | 12/1998 | Otake | 363/18 |
| 5,917,713 A | * | 6/1999 | Higuchi | 363/19 |
| 6,051,921 A | | 4/2000 | Beeteson et al. | |
| RE37,898 E | * | 11/2002 | Seragnoli | 363/19 |
| 6,501,921 B2 | | 12/2002 | Higuchi | |
| 6,529,388 B2 | | 3/2003 | Higuchi | |
| 7,295,449 B2 | * | 11/2007 | Berghegger | 363/19 |
| 2006/0092672 A1 | | 5/2006 | Cho et al. | |
| 2008/0192512 A1 | * | 8/2008 | Zheng et al. | 363/18 |

* cited by examiner

*Primary Examiner*—Matthew V Nguyen

(57) ABSTRACT

A high-voltage generator includes a high-voltage transformer having a primary coil, a secondary coil, and an auxiliary coil, and a PNP bipolar junction transistor. Based on the self-oscillation theory of a LC oscillator, an oscillating voltage is generated across the primary coil. The oscillating voltage is amplified to a high-level AC voltage through the secondary coil. One end of the auxiliary coil and an emitter of the transistor are coupled to an input DC voltage, and the other end of the auxiliary coil is connected to the base of the transistor through a RC circuit. One end of the primary coil is connected to the collector of the transistor, and the other end of the primary coil is connected to ground. Therefore, the primary coil can generate a voltage detection signal indicative of the voltage of the secondary output of the high-voltage generator by itself without using one extra voltage detection winding, so that a comparing unit can generate a control signal based on the comparison of the voltage detection signal and a reference signal to control the base current of the transistor to change the oscillating amplitude of the oscillating voltage, thereby controlling the voltage of the secondary output.

14 Claims, 3 Drawing Sheets

HIGH-VOLTAGE GENERATOR

FIELD OF THE INVENTION

The present invention is related to a high-voltage generator, and more particularly to a high-voltage generator for use in an image-forming apparatus.

BACKGROUND OF THE INVENTION

Most of the image-forming apparatuses, such as laser toner printer or fax machine, require a high-voltage generator to provide the required voltage for operation. The high-voltage generator employs a single-switch resonant circuit and enables the transistor to work in the active region, so that a low voltage received by the primary side of the transformer can be converted into a sinusoidal-wave voltage whose amplitude can be regulated by a voltage feedback signal. The sinusoidal-wave voltage is amplified across the secondary side of the transformer and converted by a rectifier/multiplier unit into a high-level DC voltage whose voltage level can be regulated for the image-forming apparatus.

FIG. 1 shows a circuit diagram of a high-voltage generator for laser toner printer according to the prior art. As shown in FIG. 1, a high-voltage generator includes a high-voltage transformer T12 having a primary coil N11, a secondary coil N12 and an auxiliary coil N13. A pulse-width-modulation (PWM) signal 41 is filtered by a filter consisted of a resistor R11 and a capacitor C11, thereby generating a DC reference voltage Vref at the positive input terminal of an operational amplifier 18, in which the DC reference voltage Vref can be adjusted depending on the duty cycle of the PWM signal 41. One end of the primary coil N11 is connected to an input DC voltage Vin, and the other end of the primary coil N11 is connected to the collector of a switch device 16 which is implemented by a NPN-type bipolar junction transistor. The base of the switch device 16 is connected to one end of the auxiliary coil N13, and the emitter of the switch device 16 is connected to ground. A feedback control unit 11 is connected between the output of the high-voltage generator and the operational amplifier 18 for detecting the variations on the output voltage of the high-voltage generator and in response to the results of detection sending a feedback signal to the negative input terminal of the operational amplifier 18. The feedback signal is compared with the DC reference voltage Vref and in response to the results of comparison generates a voltage control signal 48. The voltage control signal 48 is sent to the other end of the auxiliary coil N13 for controlling the base DC current of the switch device 16; and the AC current on the base of the switch device 16 is provided through the auxiliary coil N13 whose voltage is induced by the primary coil N11, thereby reaching the goal of changing the oscillating amplitude of the oscillating voltage on the primary coil N11. Therefore, the voltage control signal 48 can control the oscillating amplitude of the oscillating voltage on the primary coil N11, thereby regulating the secondary output Vout of the high-voltage generator to be the voltage specified by the duty cycle of the PWM signal 41. Here, the oscillating voltage on the primary coil N11 is amplified by the secondary coil N12 and thus a high-level AC voltage is induced across the secondary coil N12. Next, the high-level AC voltage is converted by a secondary rectifier/multiplier unit 13 into a high-level DC output voltage Vout which is a positive voltage or a negative voltage having a voltage level of thousands or hundreds volts. The polarity of the high-level output voltage Vout depends on the connection topology of the feedback control unit 11 and the secondary rectifier/multiplier unit 13. The scheme that presents a similar topology with the high-voltage generator of FIG. 1 is given in U.S. Pat. No. 6,051,921 and US Patent Publication No. 2006/0092672, all of which are incorporated herein for reference.

Although the high-voltage generator of FIG. 1 can provide a sufficient high-level output voltage Vout to drive the image duplicating elements within an image-forming apparatus, some crucial drawbacks are still unresolved. The most significant drawback is caused by the feedback signal provided to the negative input terminal of the operational amplifier 18 which is generated by downscaling the secondary output of the high-voltage generator through the feedback control unit 11. As state above, the secondary output Vout of the high-voltage generator is a high-level DC voltage having a voltage level of thousands volts. Nonetheless, the voltage level of the feedback signal which is sent to the negative input terminal of the operational amplifier 18 is generally several volts. Therefore, the feedback control unit 11 must include a voltage divider consisted of high-impedance resistors. In this case, the output transient response of the high-voltage generator to the variations on the PWM signals or the output impedance will become very slow. If it is desired to improve the output transient response, the impedance of the voltage-dividing resistors within the feedback control unit 11 has to be reduced. However, this would cause a considerable power loss. In addition, if it is desired to change the polarity of the output voltage Vout, the polarity of the diodes within the secondary rectifier/multiplier unit 13 has to be reversed and the connection topology of the feedback control unit 11 has to be changed as well. Therefore, the scheme set forth in FIG. 1 is not possible to satisfy the needs of providing outputs with different polarities by the same printed circuit board.

FIG. 2 shows a modified high-voltage generator according to the prior art. As shown in FIG. 2, a high-voltage transformer T22 has a primary coil N21, a secondary coil N22, an auxiliary coil N23 and a voltage detection coil N24. An input DC voltage Vin is connected to one end of the primary coil N21, and the collector of a switch device 26 which is implemented by a NPN-type bipolar junction transistor is connected to the other end of the primary coil N21. The base of the switch device 26 is connected to one end of the auxiliary coil N23, and the emitter of the switch device 26 is connected to a ground terminal. The voltage detection coil N24 is configured to generate an AC voltage associated with the secondary output Vout of the high-voltage generator. The AC voltage outputted from the voltage detection coil N24 is converted by a primary rectifier/multiplier unit 25 into a voltage detection signal 42, which represents the secondary output Vout of the high-voltage generator. Next, the voltage detection signal 42 is divided by a voltage divider (R21, R22) into a fractional voltage detection signal 43, which is inputted into a voltage control unit 27 along with a pulse-width modulation signal 44. The voltage control unit 27 compares the fractional voltage detection signal 43 with a DC voltage which is generated by filtering the pulse-width modulation signal 44 through a filter consisted of a resistor R25 and a capacitor C25, and in response to the results of comparison outputs a voltage control signal 49. The voltage control signal 49 is sent to the other end of the auxiliary coil N23 through resistors R23 and R24, and provided to the base of the switch device 26 through the auxiliary coil N23. The voltage control signal 49 is configured to control the base current of the switch device 26 and thus control the oscillating amplitude of the oscillating voltage on the primary coil N21, thereby generating the secondary output Vout of the high-voltage generator to the voltage specified by the duty cycle of the pulse-width modulation signal 44. Here, the voltage on the primary coil N21 is amplified by the secondary coil N22, and the amplified voltage is induced across the secondary coil N22. The high-level AC voltage is converted by the secondary rectifier/multiplier unit 28 into a high-level DC output voltage Vout which is a positive voltage or a negative voltage having a voltage level of thousands or hundreds volts. It is to be noted that the polarity of the high-level output voltage Vout does not depend on the primary rectifier/multiplier 25 or the voltage control unit 27 of FIG. 2 but depends on the connection topology of the secondary rectifier/multiplier unit 28 only. Because the fractional voltage detection signal 43 is generated by low-impedance voltage-dividing resistors, the output transient response of the high-voltage generator can be improved. More advantageously, regardless of the polarity of the secondary output Vout, the voltage detection coil N24 and the primary rectifier/multiplier unit 25 can generate a voltage detection signal which is a positive voltage. Therefore, if it is desired to change the polarity of the secondary output Vout, it can be accomplished by reversing the polarities of the rectifying diodes within the secondary rectifier/multiplier unit 28 without modifying the circuitries of the primary rectifier/multiplier 25 and the voltage control unit 27. Therefore, it is possible to provide outputs with different polarities by the same printed circuit board. The scheme that presents a similar topology with the high-voltage generator of FIG. 2 is given in U.S. Pat. No. 6,529,388, which is incorporated herein for reference.

It can be understood from the above descriptions that the high-voltage generator as shown in FIG. 2 is configured to generate an AC voltage associated with the secondary output Vout of the high-voltage generator across the voltage detection coil N24, which is located in the low-voltage side of the transformer, so that the resistance of the resistor R21 does not have to be large to obtain the desired detection signal 43. Also, the AC voltage associated with the secondary output Vout of the high-voltage generator is converted by the primary rectifier/multiplier unit 25 into a voltage detection signal indicative of the secondary output Vout. Therefore, the output transient response of the high-voltage generator to the variations on the PWM signal or the output impedance can be improved. Furthermore, regardless of the polarity of the secondary output Vout (which depends on the polarities of the rectifying diodes within the secondary rectifier/multiplier 28), the voltage level of the voltage detection signal 42 is absolutely positive. Therefore, one printed circuit board can provide outputs with different polarities. Nonetheless, the high-voltage generator of FIG. 2 requires an additional voltage detection coil N24 to generate the voltage detection signal 42, and thus the manufacturing cost of the high-voltage transformer T22 is increased and the efficiency of the high-voltage transformer T22 is deteriorated.

There is a tendency to develop a high-voltage generator that can achieve output voltage regulation with a minimum number of transformer coils and improve the output transient response and reduce the power loss, and further enhance the compatibility of the printed circuit board for outputs with different polarities.

SUMMARY OF THE INVENTION

An object of the present invention is to provide a high-voltage generator for use in an image-forming apparatus. The inventive high-voltage generator can improve the output transient response performance of the high-voltage generator and reduce the power loss of the high-voltage generator with a minimum number of transformer coils.

To this end, the present invention proposes a high-voltage generator, including:

1. A switch device, such as a PNP-type bipolar junction transistor having a base, an emitter, and a collector;

2. A transformer having a primary coil, a secondary coil and an auxiliary coil, wherein one end of the auxiliary coil is connected to the base of the switch device through a resistor-capacitor circuit, and the other end of the auxiliary coil and the emitter of the switch device are connected to an input DC voltage. Also, one end of the primary coil is connected to the collector of the switch device, and the other end of the primary coil is connected to ground;

3. A voltage detection signal generator connected to the primary coil for receiving the output of the primary coil and generating a voltage detection signal indicative of the secondary output of the high-voltage generator; and 4. A comparing unit connected between the voltage detection signal generator and the base of the switch device for generating a voltage control signal based on the voltage detection signal and a switch control signal such as a pulse-width modulation signal, wherein the voltage control signal is provided to the base of the switch device to regulate the base current of the switch device so that the oscillating amplitude of the AC oscillating sinusoidal-wave voltage on the primary coil can be varied to regulate the output DC voltage of the high-voltage generator according to the PWM signal.

Generally, the comparing unit includes an operational amplifier, and the voltage detection signal generator includes a primary rectifier/multiplier unit and a voltage divider.

Generally, the AC oscillating voltage on the primary coil is amplified by the secondary coil so as to induce a high-level AC voltage across the secondary coil.

In addition, the high-voltage generator further includes a secondary rectifier/multiplier unit which is connected to the secondary coil and includes a plurality of diodes and capacitors for rectifying and boosting the high-level AC voltage across the secondary coil so as to generate a DC output voltage of the high-voltage generator.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 3:
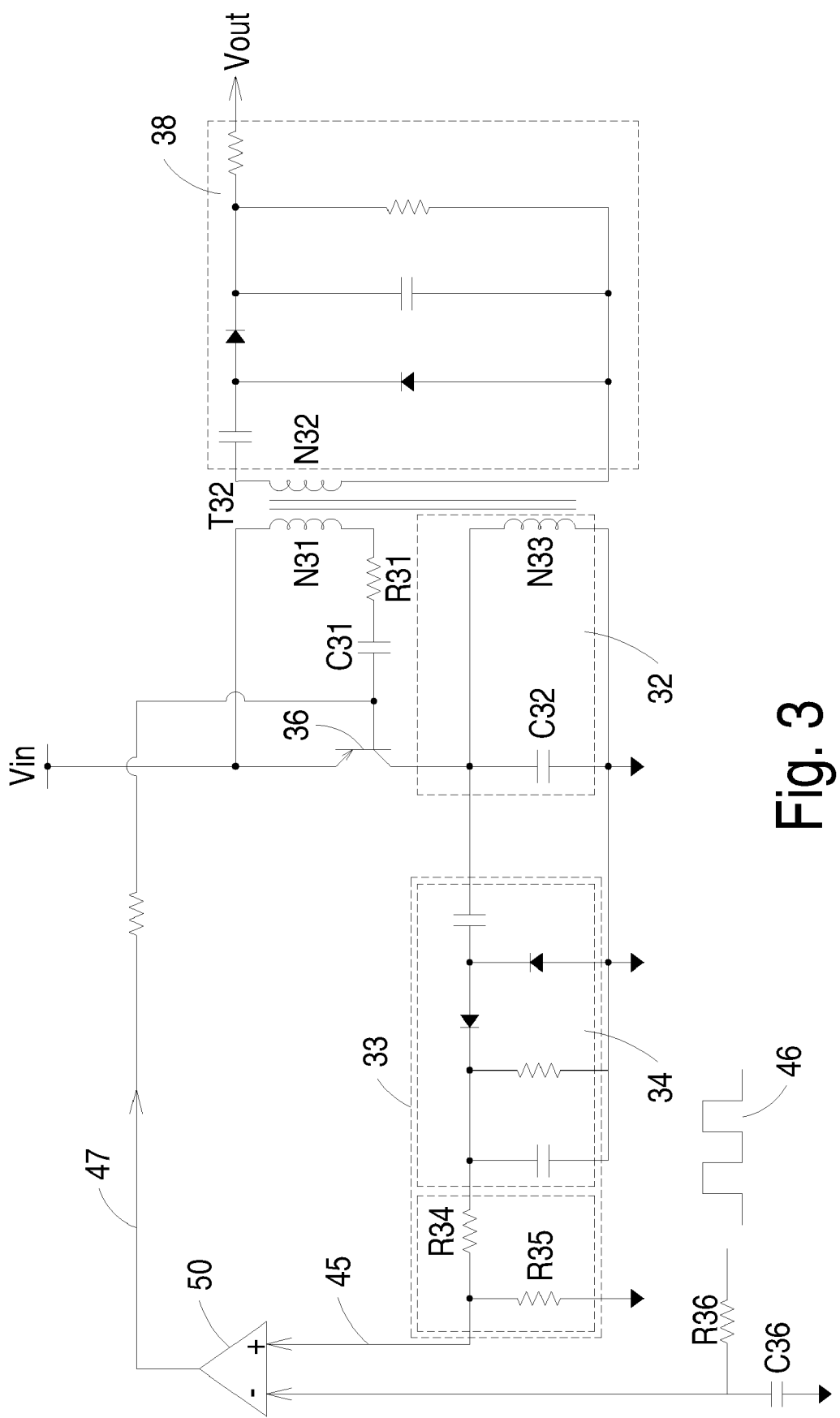
FIG. 3 is a diagrammatic view showing a high-voltage generator according to the present invention.

FIG. 3 illustrates a high-voltage generator according to a preferred embodiment of the present invention. As shown in FIG. 3, a high-voltage generator includes a switch device 36 implemented by a PNP-type bipolar junction transistor and a high-voltage transformer T32 having a primary coil N33, a secondary coil N32 and an auxiliary coil N31. One end of the auxiliary coil N31 and the emitter of the switch device 36 are connected to an input DC voltage Vin, and the other end of the auxiliary coil N31 is connected to the base of the switch device 36 through a resistor-capacitor circuit consisted of a resistor R31 and a capacitor C31. One end of the primary coil N33 is connected to the collector of the switch device 36, and the other end of the primary coil N33 is connected to ground. The primary coil N33 is configured to generate an AC voltage associated with the secondary output voltage Vout of the high-voltage generator. The magnetizing inductance of the primary coil N33 and the capacitor C32 form a resonant circuit 32, in which the capacitor C32 is the stray capacitance of the high-voltage transformer T32 or an external capacitor. The AC oscillating voltage on the primary coil N33 is rectified and multiplied by a primary rectifier/multiplier unit 34 located within the voltage detection signal generator 33. Next, the output of the primary rectifier/multiplier unit 34 is divided by a voltage divider (R34, R35) located within the voltage detection signal generator 33 to generate a voltage detection signal 45 indicative of the secondary output Vout of the high-voltage generator.

The voltage detection signal 45 and a DC voltage which is generated by filtering the pulse-width modulation signal 46 through a filter consisted of a resistor R36 and a capacitor C36 are respectively inputted into a positive input terminal and a negative input terminal of a comparing unit 50 which is consisted of an operational amplifier. The pulse-width modulation signal 46 is a pulse signal whose duty cycle can be varied within a predetermined range, so that the secondary output Vout of the high-voltage generator can be continuously varied according to the duty cycle of the pulse-width modulation signal 46. The comparing unit 50 is configured to compare the voltage detection signal 45 with the DC component of pulse-width modulation signal 46 and in response to the results of comparison outputs a voltage control signal 47. The voltage control signal 47 is a DC voltage which is delivered to the base of the switch device 36 through a plurality of resistors, transistors and zener diodes (not shown), and thereby controlling the base current of the switch device 36 and changing the oscillating amplitude of the AC oscillating voltage on the primary coil N33. Accordingly, the secondary output Vout of the high-voltage generator can be stabilized at the voltage level specified by the duty cycle of the pulse-width modulation signal 46.

By the voltage amplifying operation of the secondary coil N32, the AC oscillating voltage on the primary coil N33 can be amplified to a high-level AC voltage having a voltage level of hundreds or thousands volts. This high-level AC voltage is induced across the secondary coil N32. Besides, a secondary rectifier/multiplier unit 38 is mounted on the secondary side of the high-voltage transformer T32 and includes a plurality of diodes and capacitors. The secondary rectifier/multiplier unit 38 is configured to rectify and boost the high-level AC voltage across the secondary coil N32 into a desired DC voltage level. Accordingly, the voltage across the secondary coil N32 does not need to be amplified to the same voltage level with the secondary output Vout, thereby reducing the voltage stress on the secondary side of the high-voltage transformer T32. Because the circuit architecture and the operating theorem of the secondary rectifier/multiplier unit 38 is well known by those having ordinary skill in the art, it is not intended to give details herein.

Figure 1:
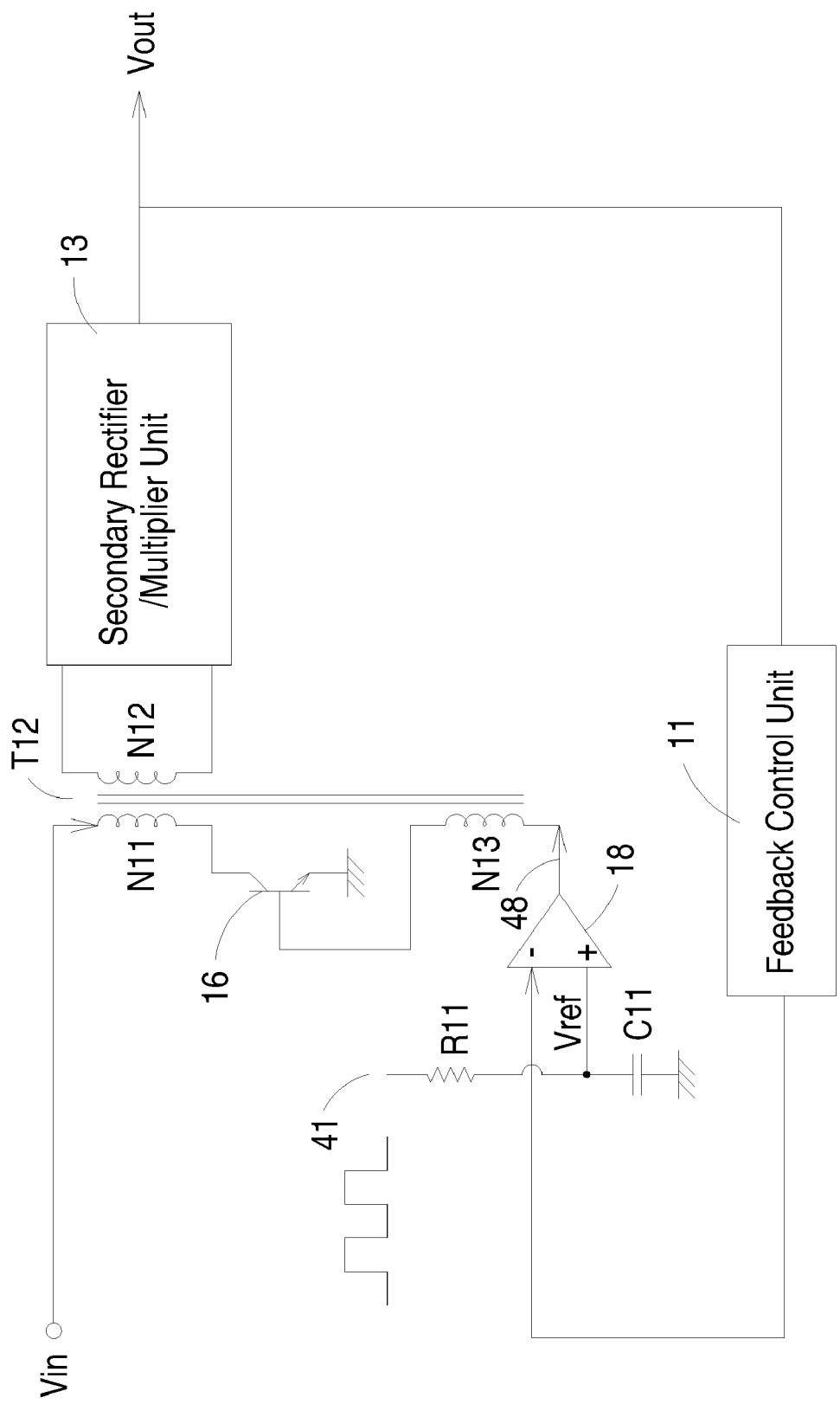
FIG. 1 is a diagrammatic view showing a high-voltage generator according to the prior art.
Figure 2:
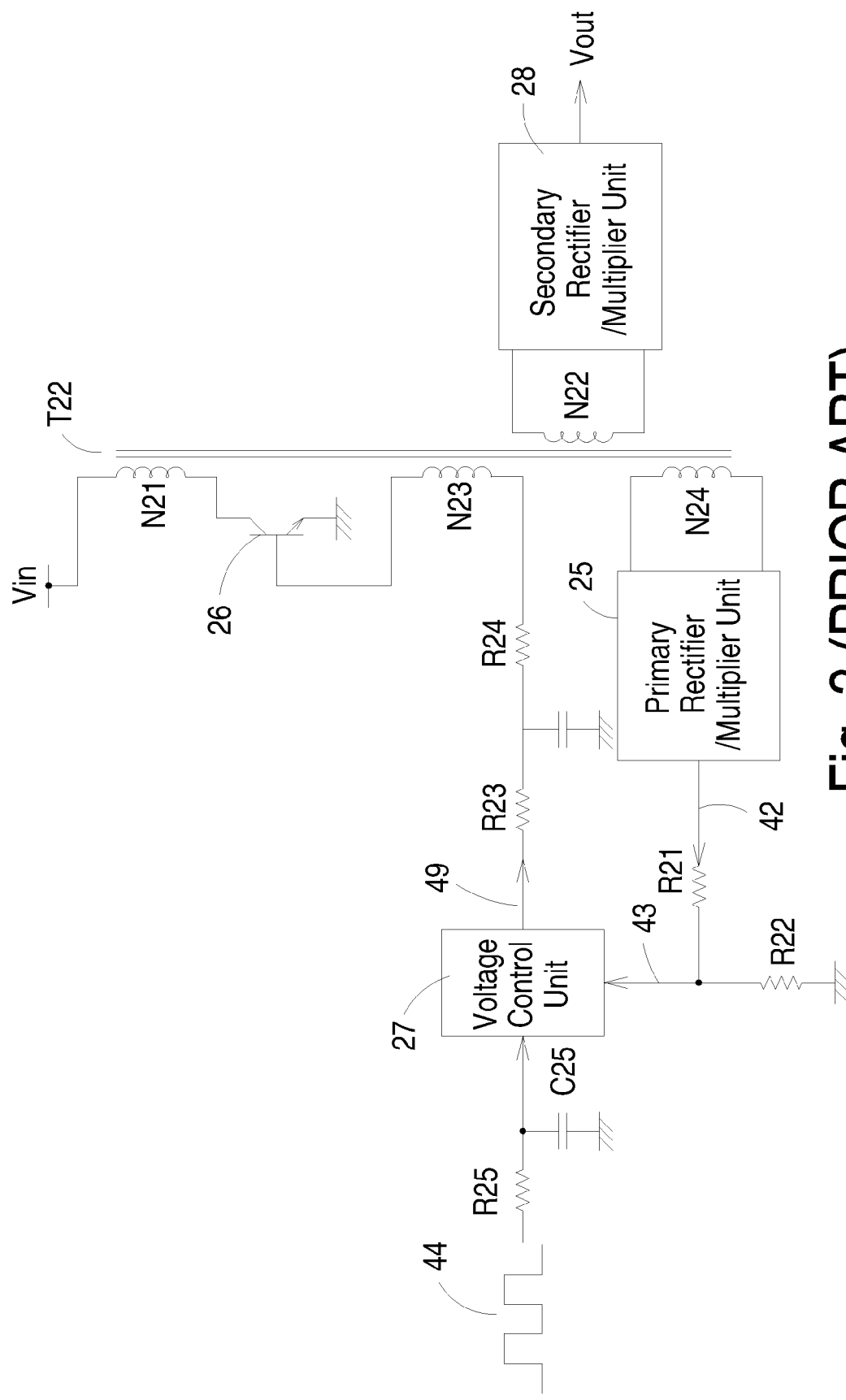
FIG. 2 is a diagrammatic view showing a modified high-voltage generator according to the prior art.

In conclusion, the high-voltage generator according to the present invention is characterized by that the output voltage Vout of the high-voltage generator is generated by amplifying the AC oscillating voltage on the primary coil through the secondary coil and rectifying and boosting the amplified AC voltage across the secondary coil. Therefore, the primary coil of the high-voltage transformer can be used to detect the secondary output of the high-voltage generator without the need of a voltage detection coil as described in the background discussion of FIG. 2. To this end, one end of the primary coil is connected to ground and a PNP-type bipolar junction transistor is used to implement the switch device. Therefore, the primary coil can induce an AC voltage associated with the secondary output of the high-voltage generator and generate a voltage detection signal indicative of the secondary output of the high-voltage generator through a primary rectifier/multiplier unit and a voltage divider. Obviously, the high-voltage generator according to the present invention can generate a voltage detection signal indicative of the secondary output of the high-voltage generator at the low-voltage side (primary side) of the high-voltage transformer. As a result, the output transient response of the high-voltage generator to the variations on the PWM signal or output load impedance can be greatly enhanced. More advantageously, the inventive high-voltage generator generates the voltage detection signal indicative of the secondary output of the high-voltage generator through the primary coil of the high-voltage transformer, so that the inventive high-voltage generator can eliminate the voltage detection coil N24 of in FIG. 2. Besides, the high-voltage generator according to the present invention uses a minimum number of transformer coils to accomplish output voltage regulation, and thus cost of the transformer is reduced and the efficiency of the transformer is enhanced. If it is desired to change the polarity of the output voltage Vout, it can be accomplished by reversing the polarity of the diodes within the secondary rectifier/multiplier unit 38 only. Therefore, another advantage of the present invention is that outputs with different polarities can be provided by the same printed circuit board.

Those of skilled in the art will recognize that these and other modifications can be made within the spirit and scope of the present invention as further defined in the appended claims.

What is claimed is:
1. A high-voltage generator comprising:
    a switch device having a control terminal, a first current-conducting terminal and a second current-conducting terminal;
    a transformer having a primary coil, a secondary coil, and an auxiliary coil, wherein one end of the auxiliary coil is connected to the control terminal, and the other end of the auxiliary coil and the first current-conducting terminal of the switch device are connected to an input DC voltage, and wherein one end of the primary coil is connected to the second current-conducting terminal of the switch device and the other end of the primary coil is connected to ground;
    a voltage detection signal generator connected to the primary coil for receiving an output of the primary coil and generating a voltage detection signal indicative of an output voltage of the high-voltage generator; and
    a comparing unit connected between the voltage detection signal generator and the control terminal of the switch device for generating a voltage control signal according to the voltage detection signal and a switch control signal, wherein the voltage control signal is sent to the control terminal of the switch device to regulate the output voltage of the high-voltage generator.

2. The high-voltage generator according to claim 1 wherein the auxiliary coil is connected to the control terminal of the switch device through a resistor-capacitor circuit.

3. The high-voltage generator according to claim 1 wherein the switch device is a PNP-type bipolar junction transistor, and wherein the control terminal of the PNP-type bipolar junction transistor is a base terminal, the first current-conducting terminal of the PNP-type bipolar junction transistor is an emitter terminal, and the second current-conducting terminal of the PNP-type bipolar junction transistor is a collector terminal.

4. The high-voltage generator according to claim 3 further comprising a capacitor connected between the second current-conducting terminal of the switch device and a ground terminal for forming a resonant circuit with a magnetizing inductance of the primary coil.

5. The high-voltage generator according to claim 4 wherein the capacitor is the stray capacitance of the transformer or an external capacitor.

6. The high-voltage generator according to claim 4 wherein the voltage control signal is configured to control the current flowing into the control terminal of the switch device so as to change the oscillating amplitude of an oscillating voltage on the primary coil, thereby regulating the output voltage of the high-voltage generator.

7. The high-voltage generator according to claim 6 wherein the output voltage of the high-voltage generator is generated by the secondary coil.

8. The high-voltage generator according to claim 7 wherein the oscillating voltage of the primary coil is amplified by the secondary coil so as to induce a high-level AC voltage across the secondary coil.

9. The high-voltage generator according to claim 8 further comprising a secondary rectifier/multiplier unit connected to the secondary coil for rectifying and boosting the high-level AC voltage across the secondary coil so as to generate the DC output voltage of the high-voltage generator.

10. The high-voltage generator according to claim 9 wherein the secondary rectifier/multiplier unit comprises a plurality of diodes and capacitors.

11. The high-voltage generator according to claim 1 wherein the switch control signal is a pulse-width modulation signal.

12. The high-voltage generator according to claim 11 wherein the comparing unit includes an operational amplifier having a positive input terminal for receiving the voltage detection signal and a negative input terminal for receiving the pulse-width modulation signal.

13. The high-voltage generator according to claim 1 wherein the voltage detection signal generator comprises:
 a primary rectifier/multiplier unit connected to the primary coil for performing rectification and multiplication to an output of the primary coil; and
 a voltage divider connected to the primary rectifier/multiplier unit for dividing the output of the primary rectifier/multiplier unit to generate the voltage detection signal.

14. The high-voltage generator according to claim 1 wherein the voltage control signal is a DC voltage.

* * * * *